(No Model.)

J. L. YOST.
TIRE FASTENING FOR BICYCLES.

No. 510,307.    Patented Dec. 5, 1893.

Witnesses
Edwin L. Bradford
Curtis Hammond

Joseph L. Yost
Inventor
By Wm C McIntire
Attorney

THE NATIONAL LITHOGRAPHING COMPANY,
WASHINGTON, D. C.

UNITED STATES PATENT OFFICE.

JOSEPH L. YOST, OF TOLEDO, OHIO, ASSIGNOR TO THE YOST MANUFACTURING COMPANY, OF SAME PLACE.

TIRE-FASTENING FOR BICYCLES.

SPECIFICATION forming part of Letters Patent No. 510,307, dated December 5, 1893.

Application filed September 1, 1893. Serial No. 484,565. (No model.)

*To all whom it may concern:*

Be it known that I, JOSEPH L. YOST, a citizen of the United States, residing at Toledo, in the county of Lucas and State of Ohio, have invented certain new and useful Improvements in Tire-Fastenings for Bicycles; and I do hereby declare the following to be a full, clear, and exact description of the invention, such as will enable others skilled in the art to which it appertains to make and use the same.

My invention relates to certain new and useful improvements in the means for securing pneumatic tires in place upon the rims of bicycle wheels, and particularly to that class in which wires are employed in a stretched condition within pockets provided in the edges of the tire or tire covering.

My invention has for its object the prompt and ready adjustment of the wire in its place, and equally ready removal of the same, and a further object of compensating for any slack in the wire or stretch resulting from use.

With these ends in view my invention consists in forming the binding wire at each end with a headed right angle hook or arm, the two arms being bent or turned in opposite directions, one of them being pivotally secured within one end of a short swinging lever, and the other adapted to be embraced by notches or pockets in the edge of the lever, as will be hereinafter and in detail explained.

Figure 1:
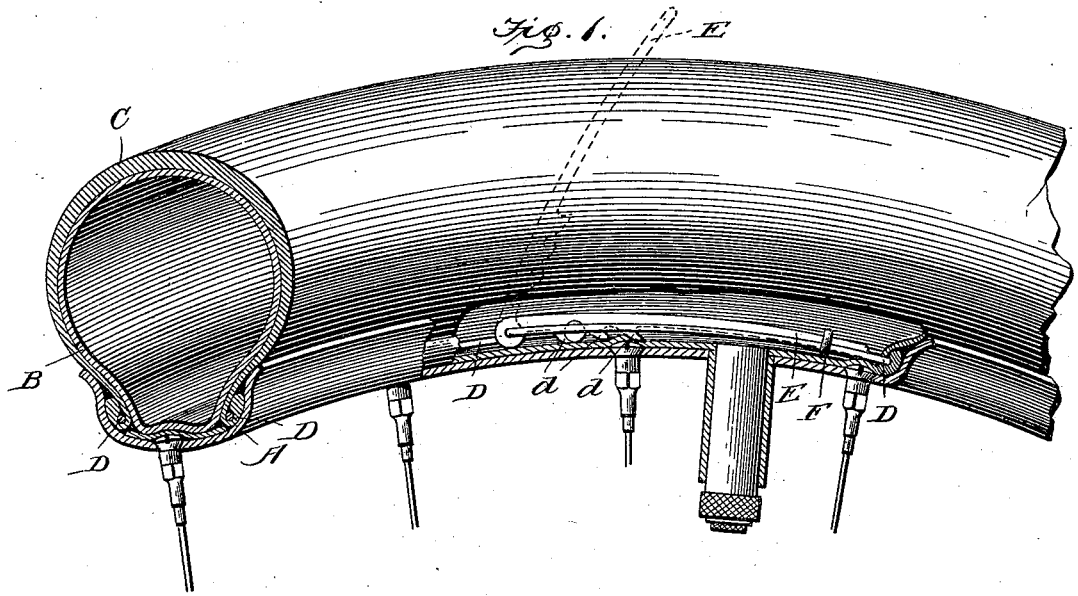
Figure 2:
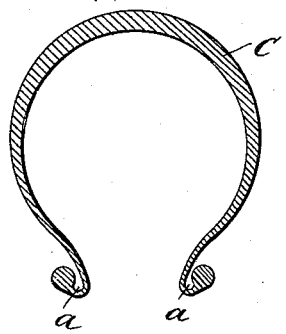
Figure 3:
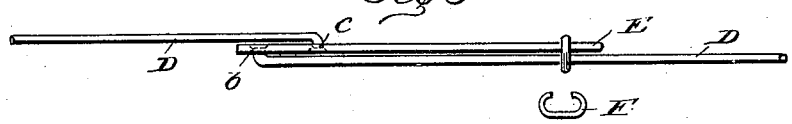

In the accompanying drawings—Figure 1 is a perspective view of a tire representing my improvements applied thereto, one end being shown in section and the central portion broken away to expose the stretching and locking device. Fig. 2 is a cross section of the tire cover; and Fig. 3 is a top view showing the ends of the tire fastening wire, the stretching and locking lever, and a wire ring for locking the lever in position.

Similar letters indicate like parts in the several figures.

A represents the metal rim of the wheel, B the inner inflatable tube and C the outer tread or covering, having the edges thereof formed with the usual pockets $a$ to receive the fastening wire. The wire D has one end turned at right angles and passed through a hole in the enlarged end of a short lever E, and headed as seen at $b$, Fig. 3, so as to form a pivot upon which the lever swings. The opposite end of the wire is turned at right angles in the opposite direction and headed as shown at $c$, Fig. 3, and the lever E is formed near its pivotal end with a series of notches or grooves adapted to fit over the free end of the wire D and back of the head $c$. The wire D being of a length approximately to encircle the rim is placed in the usual way within the pocket $a$ of the tire or covering and the free end is pulled or drawn by or beyond the pivoted end, until the wire is perfectly taut or sufficiently so to thoroughly bind the edges of the covering C within the groove in the rim A. The lever E is then forced down into the plane coincident with the wire and a loose wire ring F is slid along the wire D and over the free end of the lever to lock the same in place, as clearly shown in solid lines at Fig. 1.

When it is desired to release the wire for the purpose of removal of the tire completely, or at any particular point, for any purpose, the wire ring F is removed from the end of the lever E and the latter is raised upward, as shown in dotted lines at Fig. 1, thus releasing it from the head $c$ on the free end of the wire and leaving the latter free to be lifted or entirely removed. It will also be seen that as the lever D is provided with a series of notches $d$, any ordinary or usual slack occurring by stretching of the wire can be readily taken up.

The device described is not only simple and economic of construction but when employed in connection with the tire no special tool of any kind is required to manipulate it, and it can be readily removed and replaced in the shop or on the road by any one desiring to do so.

While I have shown the free end of the wire D formed with an arm provided with a head $c$, it will be understood that if desirable the head $c$ may be omitted, and the grooves or notches $d$ may be so formed as to securely interlock under the strain of the wire, and thus avoid the absolute necessity of the sliding ring F.

Having described the construction and operation of my improved means for securing tires in place, what I claim as new, and desire to secure by Letters Patent, is—

1. The securing wire D having one end pivotally connected with a lever E provided with one or more notches $d$, and the opposite end of said wire formed with a projecting arm adapted to interlock with the notches formed in the lever, substantially as and for the purpose set forth.

2. In combination with the rim A, tire B, and covering C, the latter having pockets $a$, the wire D formed with projections as described, and the lever E pivoted to one end of the wire and provided with a series of notches $d$, substantially as and for the purpose described.

In testimony whereof I affix my signature in presence of two witnesses.

JOSEPH L. YOST.

Witnesses:
M. D. BAKER,
L. D. POWERS.